United States Patent
Cunha et al.

(10) Patent No.: US 6,460,580 B1
(45) Date of Patent: Oct. 8, 2002

(54) SELF-CONTAINED LIQUID STORAGE, DELIVERY, AND AUTOMATIC FILL APPARATUS AND METHOD

(75) Inventors: James P. Cunha, Westford, MA (US); Dennis J. Cohlmia, Wichita, KS (US); James A. Steinbacher; Joel D. Hockenbury, both of Arkansas City, KS (US)

(73) Assignee: Kan-Pak, L.L.C., Arkansas City, KS (US)

( * ) Notice: Subject to any disclaimer, the term of this patent is extended or adjusted under 35 U.S.C. 154(b) by 0 days.

(21) Appl. No.: 09/650,586

(22) Filed: Aug. 30, 2000

Related U.S. Application Data (60) Provisional application No. 60/156,976, filed on Oct. 1, 1999.

(51) Int. Cl.[7] ................................................ B65B 1/04
(52) U.S. Cl. ........................... 141/196; 141/2; 141/18; 141/82; 141/95; 222/146.6
(58) Field of Search ................... 141/2, 18, 82, 141/94, 95, 100, 105, 107, 192, 196, 198, 234, 237, 363, 366, 375, 382; 62/348, 352, 336–339; 222/56, 64, 146.1, 146.6, 129, 129.1

(56) References Cited

U.S. PATENT DOCUMENTS

| | | | |
|---|---|---|---|
| 3,528,587 A | 9/1970 | Popinski | 222/56 |
| 3,638,392 A | 2/1972 | Welker, Jr. et al. | 53/123 |
| 3,656,316 A | 4/1972 | Stock | 62/306 |
| 3,828,572 A | 8/1974 | Calim | 62/340 |
| 3,874,189 A * | 4/1975 | Calim | 222/406 |
| 3,898,859 A * | 8/1975 | Duke | 62/135 |
| 3,934,427 A | 1/1976 | Keyes | 62/342 |
| 4,201,558 A | 5/1980 | Schwitters et al. | 62/70 |
| 4,487,337 A | 12/1984 | DeJardins | 222/129.3 |
| 4,528,824 A | 7/1985 | Herbert | 62/331 |
| 4,538,427 A | 9/1985 | Cavalli | 62/342 |
| 4,544,084 A | 10/1985 | Cleland | 222/56 |
| 4,728,005 A | 3/1988 | Jacobs et al. | 222/64 |
| 4,869,072 A | 9/1989 | Sexton et al. | 62/136 |
| 5,000,352 A | 3/1991 | Cleland | 222/129.2 |
| 5,348,753 A | 9/1994 | Abnell et al. | 426/231 |
| 5,417,355 A * | 5/1995 | Broussalian et al. | 222/146.6 |
| 5,419,150 A | 5/1995 | Kaiser et al. | 62/342 |
| 5,487,493 A | 1/1996 | McNabb | 222/153.14 |
| 5,588,558 A | 12/1996 | Cox et al. | 222/64 |
| 5,706,720 A * | 1/1998 | Goch et al. | 99/455 |
| 5,771,917 A | 6/1998 | Carney et al. | 137/238 |
| 5,799,832 A * | 9/1998 | Mayo | 222/135 |
| 5,813,574 A | 9/1998 | McNabb | 222/146.6 |
| 5,950,448 A | 9/1999 | Barnes et al. | 62/390 |
| 5,967,226 A | 10/1999 | Choi | 165/63 |
| 6,082,123 A * | 7/2000 | Johnson | 62/136 |

FOREIGN PATENT DOCUMENTS

| | | | |
|---|---|---|---|
| GB | 2154204 | 9/1985 | B67D/5/64 |
| GB | 2287306 | 9/1995 | F25C/1/00 |

* cited by examiner

*Primary Examiner*—Steven O. Douglas
(74) *Attorney, Agent, or Firm*—Head, Johnson & Kachigian (57) ABSTRACT

A self-contained liquid storage, delivery, and automatic fill apparatus and method for a semi-frozen or chilled liquid beverage machine having a bowl to contain semi-frozen beverage. The apparatus includes at least one refrigerated storage cavity for receiving a bulk storage container of liquid beverage. A thermally conductive fluid coupling is attached to the bowl of the beverage machine. A fluid tube extends between the fluid. coupling and the storage container., A pump transports the liquid beverage from the bulk storage container through the coupling and into the bowl of the beverage machine in a totally refrigerated environment.

25 Claims, 5 Drawing Sheets

SELF-CONTAINED LIQUID STORAGE, DELIVERY, AND AUTOMATIC FILL APPARATUS AND METHOD

CROSS-REFERENCE OF RELATED APPLICATION

This application claims priority to U.S. Provisional Patent Application No. 60/156,976 filed Oct. 1, 1999, entitled SELF-CONTAINED LIQUID STORAGE, DELIVERY, AND AUTOMATIC FILL APPARATUS.

BACKGROUND OF THE INVENTION

1. Field of the Invention

The present invention relates to the storage of bulk package aseptic beverage containers and to the automatic filling of semi-frozen or chilled liquid beverage dispensers. In particular, the present invention is directed to a self-contained apparatus and process for the refrigerated storage of bulk package aseptic beverage containers, delivery of liquid from the bulk package containers, and automatic filling of semi-frozen or chilled liquid beverage dispensers.

2. Prior Art

Different types of semi-frozen and chilled liquid beverage dispensers are known. Often, these dispensers have a clear plastic container or bowl and produce the semi-frozen product from a liquid. These dispensers then store the product in a semi-frozen condition for dispensing. When the semi-frozen beverage is depleted, the bowl must be refilled. The top of the bowl is removed and liquid is replenished by an attendant. After the beverage dispenser has been refilled with liquid, a time period is required to reach the semi-frozen state. The beverage dispensers may be used for chilled beverages, frozen beverages such as lemonade, alcoholic drinks such as pina coladas or margaritas, or semi-frozen beverages sometimes known as slushies.

The beverage device itself typically includes a cylinder within the bowl which is refrigerated with refrigerant. A helical blade continually moves across the external portion of the cylinder to scrape off frozen crystals formed by the refrigeration process. Accordingly, over time, the entire contents of the bowl becomes semi-frozen and the product is mixed while in the bowl.

As the product is dispensed, the level in the bowl is lowered. A film of the product may remain on the walls of the bowl above the then current level of the chilled or semi-frozen product. The film on the bowl is not in contact with the chilled or frozen zone, has a tendency to rise to ambient temperature and requires periodic cleaning. When it is desired to clean the dispenser, a cover on the bowl may be lifted off and then slid forward. Once the contents of the bowl have been removed, the bowl can be pulled forward to the front and removed for washing and cleaning. To refill, the liquid mixture must be poured from a bulk storage container into the open top by an attendant. The process to replenish and the process to clean are both time consuming.

The liquid may be packaged for storage and transportation in various ways such as in plastic containers or other packaging.

Bulk packaging for beverage products has existed for a considerable time period. One type of bulk package is known as a "bag 'n box". A flexible inner storage membrane, such as a plastic, is retained within a rigid package such as a cardboard or corrugated box. The product packaged in this format is typically shelf stable and capable of being pumped to a dispenser from a remote location. There are a plurality of systems to accomplish this result and usually include a rack for multiple bag 'n box storage devices at a remote location, at ambient temperature, utilizing pumps to move the product from the remote station to the dispenser. Existing delivery systems, however, are designed to deliver only high acid products. Such delivery systems are not fully refrigerated. The present invention is designed to deliver both high acid products and low acid aseptic products which are subject to special regulations by the FDA. Furthermore, the delivery system is fully refrigerated.

One type of beverage is packaged and transported in aseptic conditions. The aseptic process allows beverages to be formulated without preservatives which produces a superior quality beverage compared to conventional methods. Aseptic products are shelf stable until they are opened and at that time, they need to be consumed or refrigerated.

In recent years, bulk packaging systems have been developed for aseptic liquid products. The aseptic package functions only as a package device for transportation and does not function as a delivery system for the product.

It is also well known that the shelf space in convenience stores and restaurants is extremely valuable and its use must be maximized. Accordingly, making use of existing space above beverage dispensers is desirable.

There remains a need to retrofit a liquid storage, delivery and automatic filling device to a semi-frozen liquid beverage dispenser.

There is also a need to increase production capacity of a semi-frozen liquid beverage dispenser beyond the capacity of the particular bowl and automatically fill the bowl from bulk storage.

There is also a need to decrease the downtime of a semi-frozen liquid beverage dispenser device because of required replenishing of liquid by automatically refilling the liquid dispenser device.

There is also a need to decrease the downtime of a semi-frozen liquid beverage dispenser device because of required periodic cleaning.

There is also a need to maintain the semi-frozen liquid beverage dispenser in a nearly filled condition.

There is a further need to maintain the level of beverage product in a semi-frozen liquid beverage device to maintain consistency of the beverage delivered.

There is a further need to provide a self-contained apparatus that will be accessible to attendant personnel yet take up very little shelf space.

There is a further need to provide a self-contained liquid storage, delivery, and automatic fill apparatus that will retain liquid in refrigerated condition at all times from the bulk storage package through delivery and into a chilled or semi-frozen liquid beverage device.

There is a further need to provide a self-contained liquid storage, delivery, and automatic fill process that will promote hygiene in the refilling and cleaning process and will decrease handling of bulk storage containers.

SUMMARY OF THE INVENTION

The present invention provides a self-contained liquid storage, delivery and automatic fill apparatus which will be used with a chilled or semi-frozen liquid beverage machine. In a preferred embodiment, the apparatus will include a storage cavity located in a housing. Extending from the housing are four legs which surround and straddle the beverage dispenser machine, so that the apparatus would sit on a counter top.

The apparatus may include a lighted or illuminated sign panel divided into a top panel and a pair of lower panels and may include a video monitor.

The storage cavity includes a caboose, each caboose being moveable within the cavity on a pair of tracks. The caboose moves on the tracks between a forward position and a rear, storage position. Attached to each caboose is a tray. The tray is rotatable with respect to the caboose about a hinge so that the tray moves from a storage position to a loading position. The tray is designed to receive a bulk storage container containing liquid beverage. In one embodiment, a pair of storage cavities are provided with a pair of cabooses and trays for a pair of storage containers.

A fluid tube within the apparatus will terminate on one end in a valved fitment which will be connected to a cap of the bulk storage container. The fluid tube will pass from the refrigerated storage cavity into a pumping area in one of the legs which will likewise be refrigerated. The fluid tube will thereafter terminate in a quick disconnect fluid coupling of a thermally conductive material, such as metal.

The fluid coupling will interface with and connect with a bowl coupling which is secured to the side of a bowl of the beverage dispenser machine. The bowl coupling is likewise of a thermally conductive material, such as metal, so that the bowl coupling may be connected or disconnected to the tube coupling without use of fasteners or tools. The bowl coupling has a one-way check valve.

The liquid beverage is moved from the storage container into the fluid tube and, thereafter, through the couplings and into the bowl by a peristaltic pump in one of the legs. The face of the peristaltic pump is located within the refrigerated pumping area of the leg.

A water line from a water supply may be directed to the fluid tube and thereafter into the bowl. A solenoid electric switch may be provided to open a valve to provide fresh water to the bowl of the dispenser.

Alternately, a water line from a water supply may be directed through a fluid tube and past a solenoid switch to a spray nozzle above the bowl to provide water to the bowl.

The storage cavity also includes an open front of the housing which will be closed and covered by an insulated door which will be opened for access to the storage cavity. When the door is open, the tray may be moved on the tracks from the rear, storage position to the forward position. The door may include an optional lock and may be large enough to cover a door on the leg so that the apparatus may not be tampered with except by authorized personnel.

The apparatus also includes a liquid level sensor in the form of an electric probe which will terminate in the bowl. If the liquid falls below a certain level, the circuit is interrupted and the beverage pump will be activated, thereby replenishing the bowl.

The present invention provides a totally refrigerated environment for the liquid from the bulk storage containers through the delivery system and into the beverage dispenser.

DETAILED DESCRIPTION OF THE PREFERRED EMBODIMENTS

Figure 1:
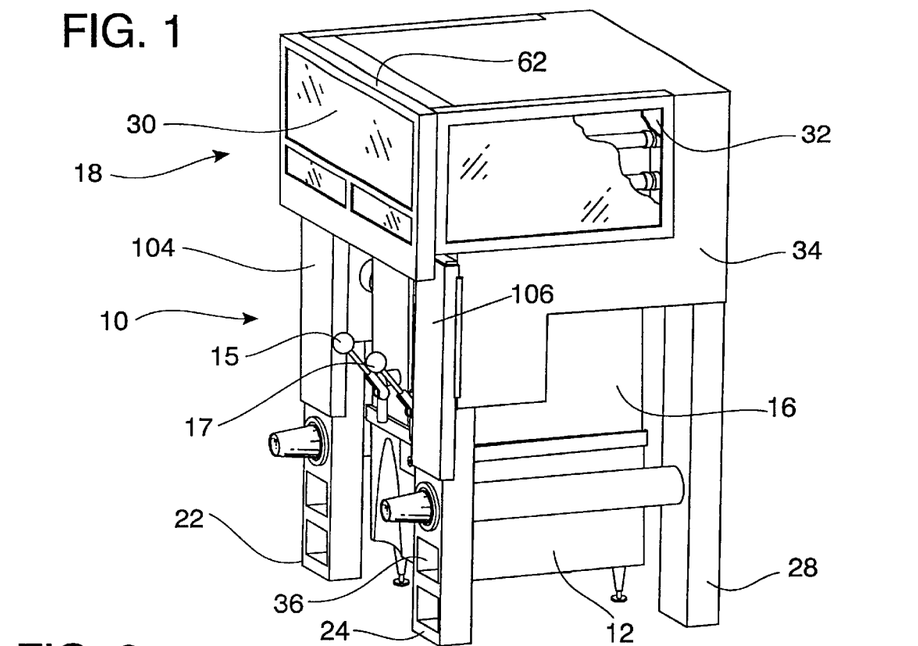
FIG. 1 is an external, perspective view of a self-contained liquid storage, delivery and automatic fill apparatus constructed in accordance with the present invention shown with a semi-frozen liquid beverage dispenser machine.
Figure 2:
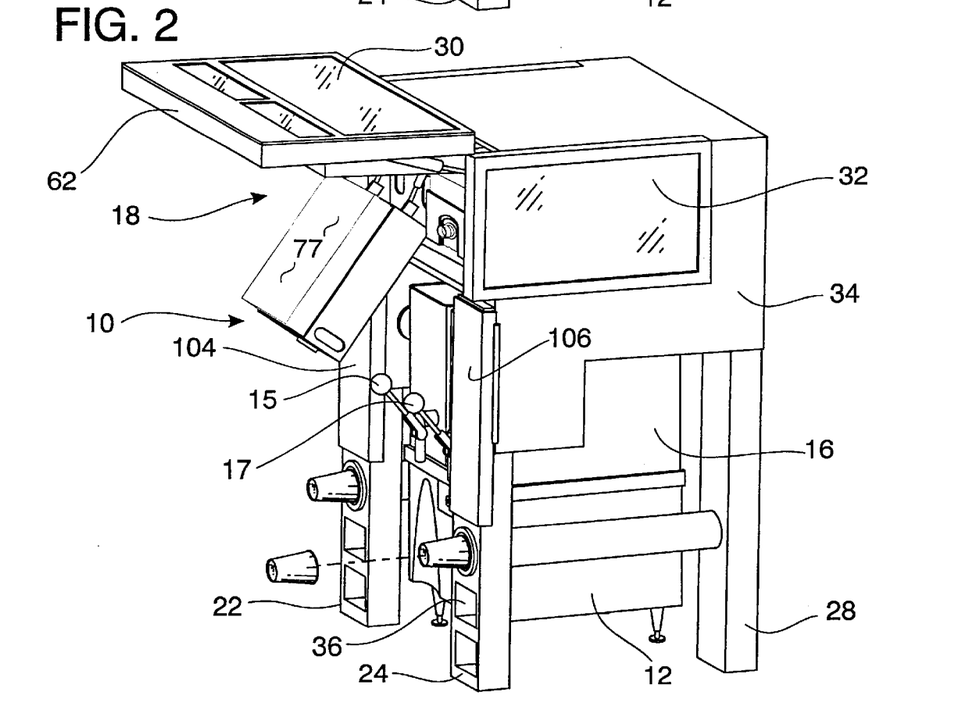
FIG. 2 is a perspective view of the apparatus shown in FIG. 1 shown with a door open and a tray in a loading position.
Figure 3:
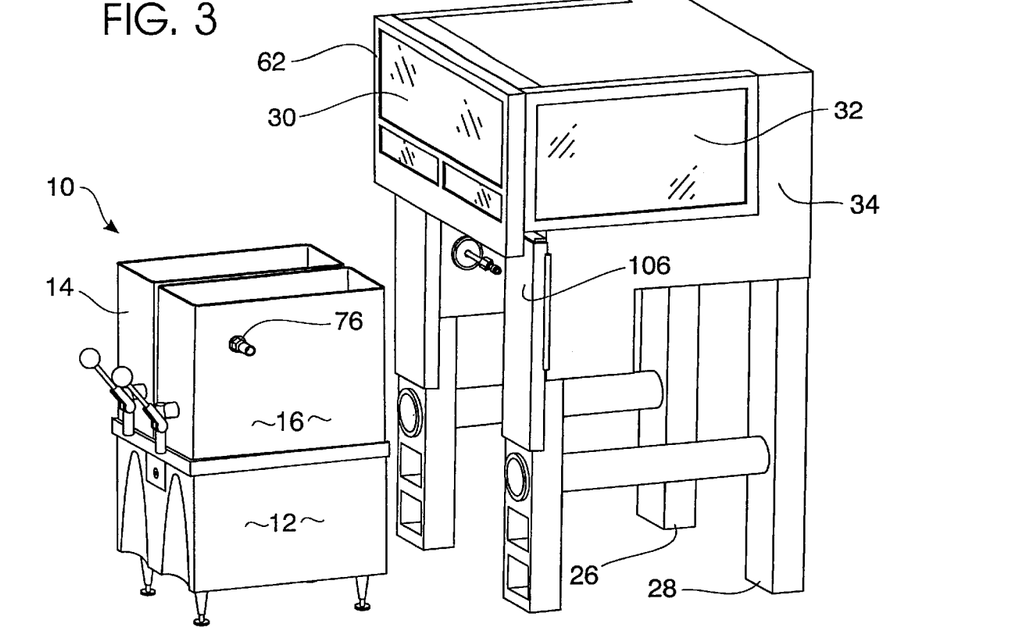
FIG. 3 is a perspective view of the apparatus shown in FIG. 1 with the semi-frozen liquid beverage dispenser separated therefrom.
Figure 4:
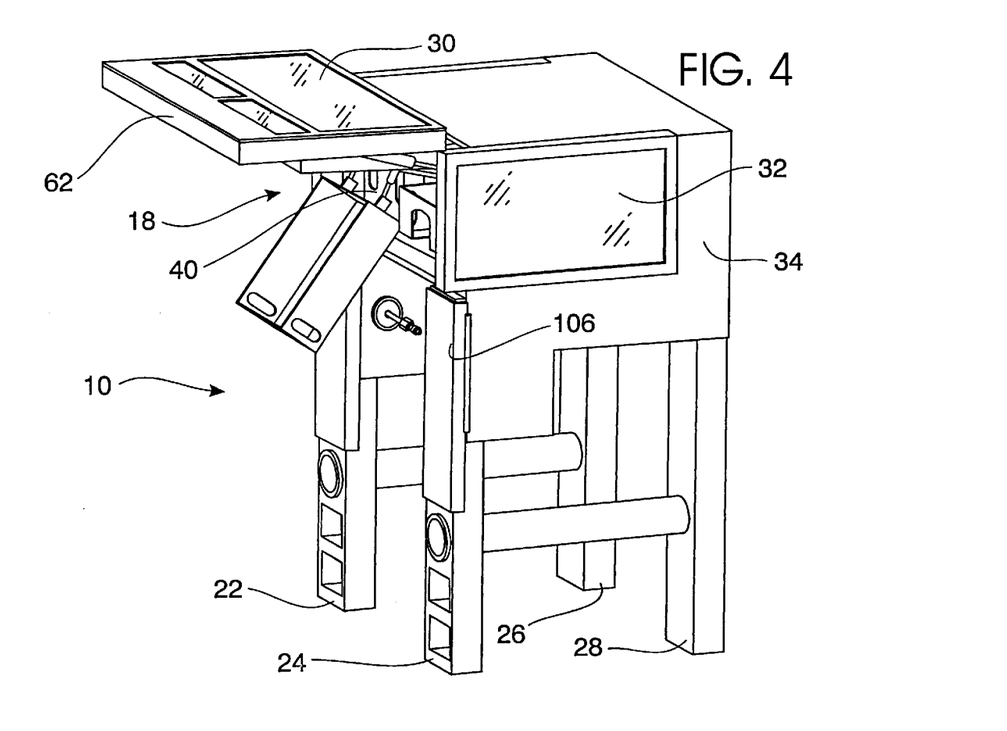
FIG. 4 is a perspective view of the apparatus shown in FIG. 3 with a door open and a tray in a loading position.

Referring to the drawings in detail, FIGS. 1 and 2 are perspective views of a self-contained liquid storage and delivery apparatus 10 in use with a semi-frozen liquid beverage dispenser machine 12 while FIGS. 3 and 4 illustrate a perspective view of the apparatus 10 with a semi-frozen liquid beverage dispenser machine 12 removed therefrom.

While one type of semi-frozen liquid beverage machine 12 is illustrated herein, it will be understood that the present invention is adaptable and readily employed with various types of semi-frozen beverage machines. Indeed, the present invention has been designed to retrofit with many existing semi-frozen liquid beverage machines. Additionally, it will be understood that while the present embodiment shows a semi-frozen beverage machine having two bowls 14 and. 16 (for preparing and storing two separate products), the beverage machine may have one or more bowls.

The semi-frozen liquid beverage dispenser machine 12 may include clear plastic bowls 14 and 16 so that the contents are visible. The dispenser machine may also include dispense handles 15 and 17, respectively. The dispenser machine will often be located on a counter (not shown) for ease of use.

The apparatus 10 includes at least one refrigerated storage cavity 18 for receiving a bulk storage container (not seen in FIG. 1) of liquid beverage. In a preferred embodiment, the bulk storage container will include a flexible membrane bag with a capped spout or fitment and a surrounding cardboard box. In the present, preferred embodiment, the apparatus 10 will include a refrigerated storage cavity 18 in a housing 34 to store a pair of bulk storage containers. In a preferred embodiment, the storage cavity may be either above the beverage dispenser or below the beverage dispenser.

The apparatus 10 also includes a plurality of legs 22, 24, 26 and 28. In the present embodiment, the apparatus 10 includes four legs which surround and straddle the beverage dispenser machine 12. The front legs may contain recesses 36 for storage for straws or other small items. The legs may also include cup sleeves.

As an option, the rear legs may contain a chamber or chambers for storing, cleaning or sanitizing solutions which may also be fed to the bowl.

The apparatus 10 may sit on a counter top (not shown) in a store or restaurant for easy access and use without interfering with the operation or use of the beverage dispenser. Accordingly, the apparatus 10 takes up little more additional counter space than the beverage dispenser machine itself.

The apparatus 10 may include a front illuminated sign panel 30 which may be further divided into a top panel for general merchandising lighted by flourescent light and a pair of lower panels lighted by incandescent light for product information. One or more side lighted sign panels 32 may also include product information or advertising.

The storage cavity 18 of the housing 34 includes an open front which will be covered by an insulated door 62 which may be opened for access to the storage cavities. The door 62 contains the illuminated front sign panels.

FIGS. 3 and 4 illustrate the apparatus 10 with the liquid beverage machine removed.

Figure 5:
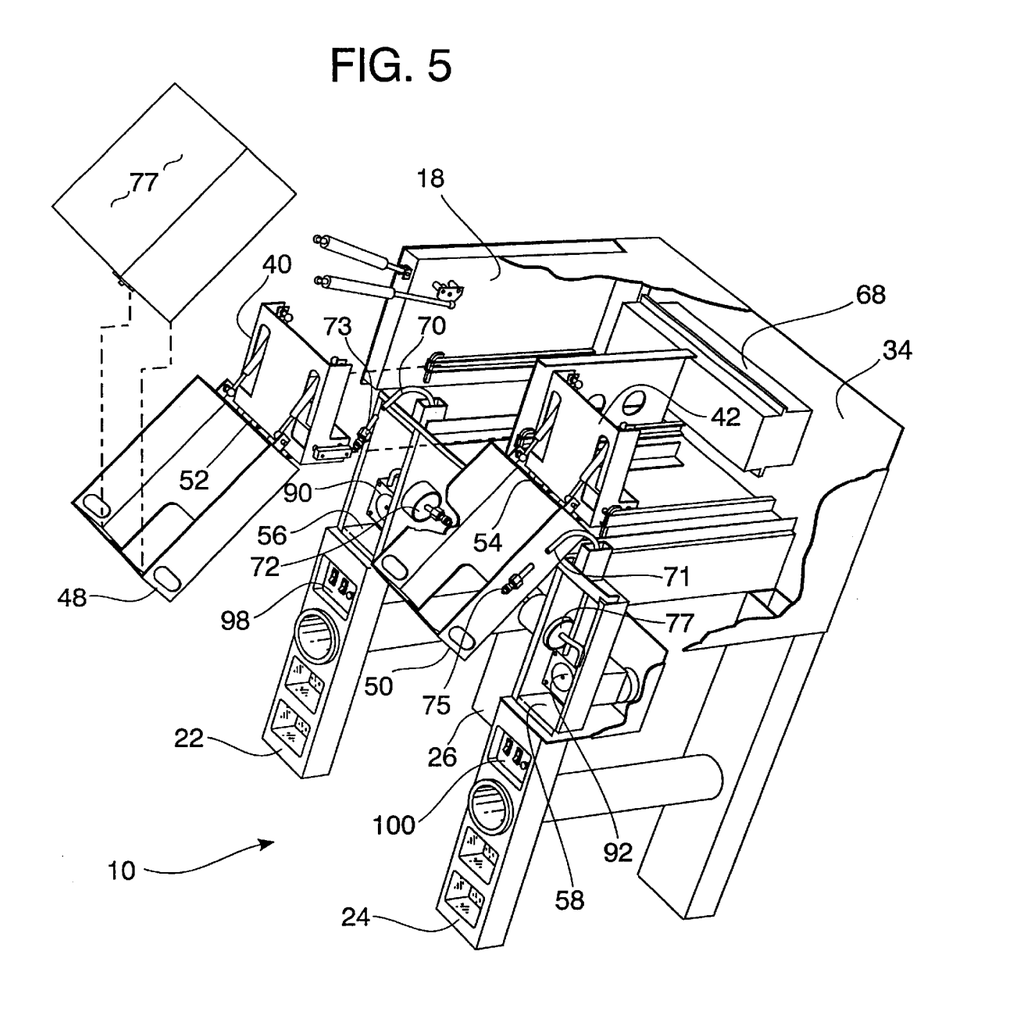
FIG. 5 is an exploded view of the apparatus shown in FIG. 1.

As best seen in FIG. 5, the storage cavity 18 includes cabooses 40 and 42, each of which is independently moveable within the cavity on tracks 44 and 46, respectively. In FIGS. 2 and 4, in cavity 18, the caboose 40 is shown in the forward position for loading and unloading of a storage container while the caboose 42 is in the rear, storage position. Each caboose is manually moveable between these two positions. Each caboose will have rollers, bearings or the like to allow movement of the caboose on the tracks.

Attached to each caboose 40 and 42 is a tray 48 and 50, respectively. The tray 48 is rotatable with respect to caboose 40 about a hinge 52, while tray 50 is rotatable with respect to caboose 42 about a hinge 54. Each tray will be permitted to rotate approximately 75° when in the forward, loading position.

As best seen in FIG. 5, a refrigeration unit 68 is located in the housing 34. Fluid tubes 70 and 71, such as neoprene hoses, within the device 10 will terminate on one end in a valved fitment 73 and 75, respectively, which will be connected to the cap of a bulk storage container (storage container 77 shown exploded from the device in FIG. 5).

As seen in FIG. 5, the fluid tubes 70 and 71 will pass from the refrigerated storage cavity 18 into and through a refrigerated pumping area in the front legs 22 or 24, respectively. The refrigerated storage cavity is in fluid communication with the pumping areas. Accordingly, the refrigeration unit will refrigerate the pumping areas as well.

The fluid tubes 70 and 71 will thereafter terminate in quick disconnect tube couplings 72 and 77 (not visible in FIG. 5, see FIG. 6) of a thermally conductive material, such as metal, which is outside of the pumping area. In the present embodiment, the tube couplings 72 and 77 will have a tapered, ribbed or barbed end that fits within the fluid tubes 70 and 71.

Figure 6:
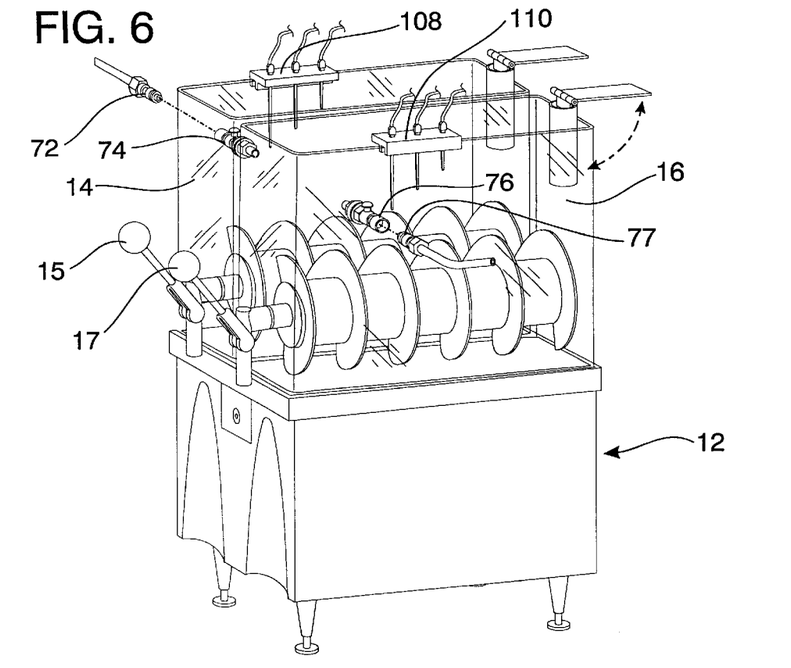
FIGS. 6 and 7 are perspective views of a semi-frozen liquid beverage dispenser machine used with the present invention.
Figure 7:
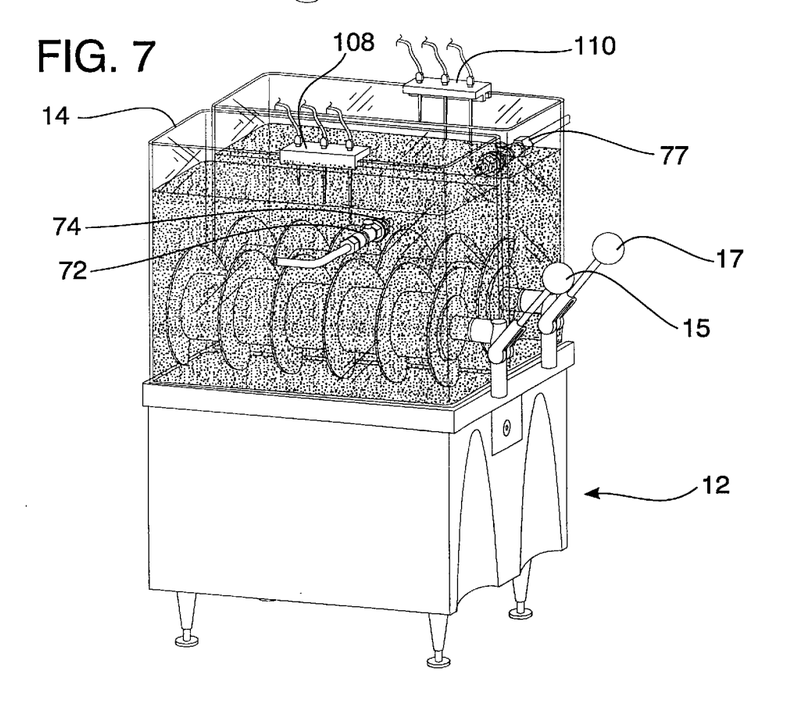
Figure 8:
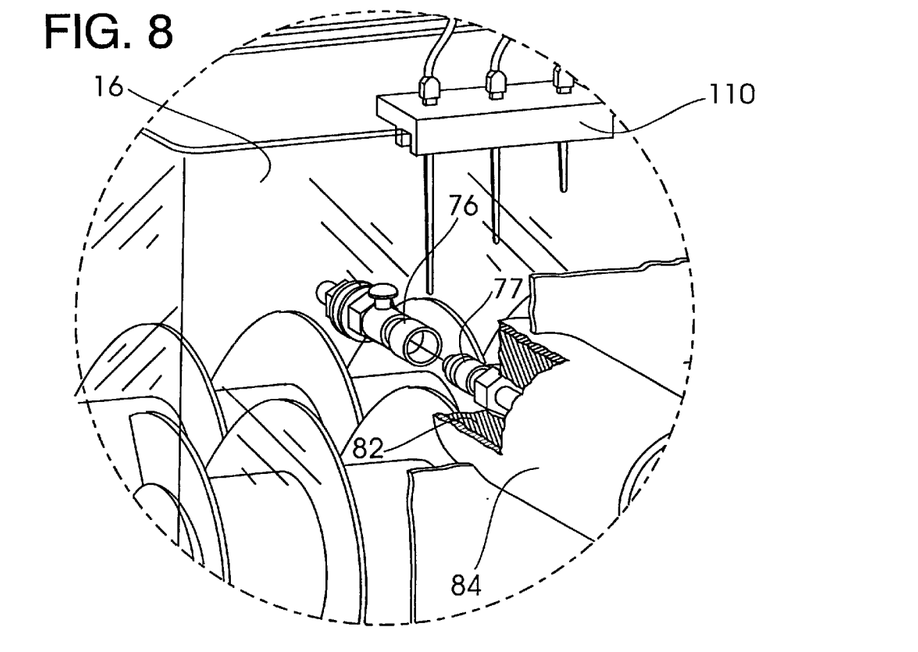
FIGS. 8 and 9 are enlarged views of the fluid connection between the semi-frozen liquid beverage dispenser and the apparatus.

FIGS. 6 and 7 illustrate the connection of the bowls 14 and 16 with the device 10. The tube couplings 72 and 77 will interface with and connect with bowl couplings 74 and 76, respectively, on the side of the bowls 14 and 16. The bowl coupling is of a thermally conductive material, such as metal, which may be connected or disconnected to the tube coupling without use of fasteners or tools. The bowl couplings 74 and 76 each have internal one-way check valves so that beverage in the bowl will not escape. It will be understood that existing semi-frozen beverage dispensers, such as 12, may be readily adapted for the present invention by drilling or making a hole in the side wall of the bowl and installing the bowl coupling 74. Ideally, the opening or hole will be made in the bowl below the fill line to retain the incoming beverage in the refrigerated condition. Since the bowl coupling 74 is below the normal level of the semi-frozen beverage and is thermally conductive, the coupling will be chilled by the beverage. Since the tube couplings are in communication with the bowl coupling, they will also be chilled.

Figure 9:
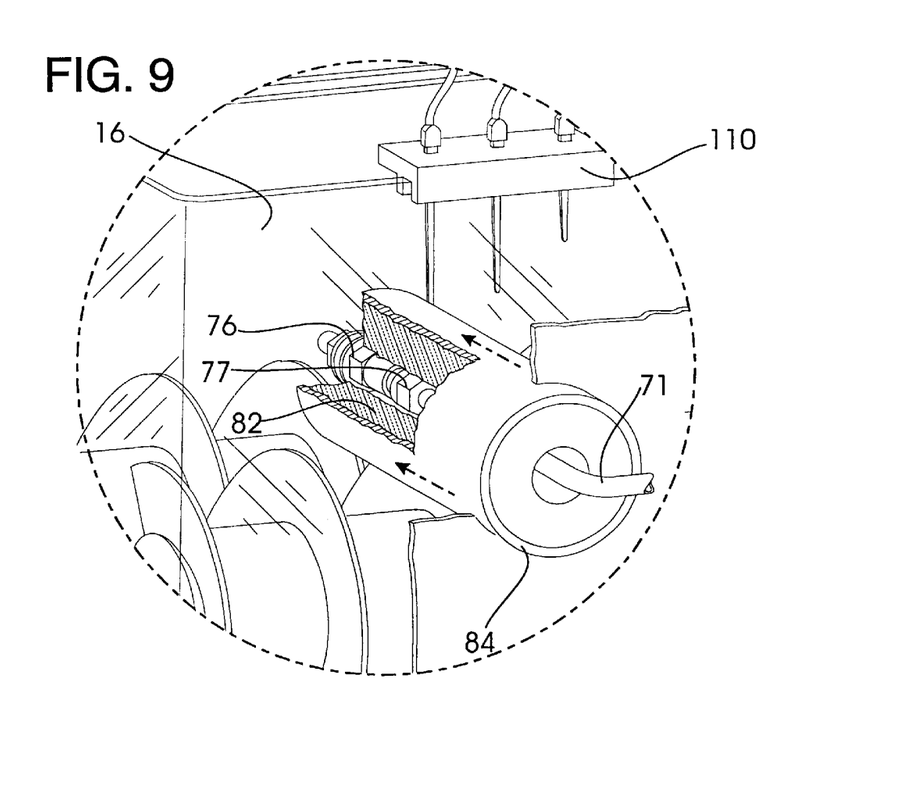

The beverage fluid passes from the bulk storage containers in the storage cavity 20 to the fluid tubes and will be delivered through openings in the quick couplings 72 and 77. The quick couplings 72 and 77 are frictionally fit within the fluid tubes. Surrounding the fluid tube 71, juxtaposed between the bowl 16 and the front leg 24, is surrounding insulation 82 which is, in turn, surrounded by PVC tubing 84 or other. rigid or semi-rigid material. As illustrated by the arrows in FIG. 9, the insulation and tubing are movable with respect to the coupling 77.

Returning to a consideration of FIG. 5, each front leg 22 and 24 includes a refrigerated pumping area 56 and 58. A beverage peristaltic pump 90 and 92 in each pumping area 56 and 58, respectively, forces liquid from the respective bulk storage container through the fluid tubes 70 and 71, through the couplings 72 and 74 (not see in FIG. 5) and into the bowls. While peristaltic pumps are used in the present embodiment, other types of pumps may be employed.

The front legs 22 and 24 may also include a control panel 98 and 100 having switches to control the pumps. It is possible for a water line to be directed to the fluid tubes 70 and 71 and thereafter into the bowl. In this manner, fresh water may be delivered from a water supply into the bowl in conjunction with the product line to blend water with concentrated product if desired.

Momentary switches, such as touch pads, or spring loaded electric switches in the control panels may be provided to activate solenoids. The solenoids are connected to a separate water line used to rinse the bowl. The water may be removed from the bowl by using the dispenser handle. Each control panel compartment may likewise contain a beverage pump switch to shut the beverage pumps off when the beverage machine is being cleaned or maintained. As seen in FIGS. 1 through 4, the control panels may be covered by doors 104 and 106.

Returning to a consideration of FIGS. 6 and 7, the apparatus 10 also includes a liquid level sensor 108 and 110 for each bowl which includes an electric probe. If the liquid falls below a certain level, the electric circuit is interrupted. Thereafter, one of the beverage pumps will be activated, automatically pumping fluid from the storage replenishing the bowl. The liquid level sensor may also be wired to one of the lights on the door, so that if the circuit has been interrupted, the light will flash. This will notify the attendant that the bulk storage container should be replaced.

Alternately, the liquid level sensors 108 and 110 may be located on a pivotal device at the rear of the bowls so that they raise out of the bowls, allowing the bowls to be removed.

The present invention 10 provides a totally refrigerated environment for the bulk storage containers, provides for delivery of the liquid beverage from the bulk storage containers and provides for automatic filling of the beverage dispenser.

In summary, the present invention provides a self-contained liquid storage and delivery apparatus for a semi-frozen liquid beverage machine having a bowl to contain semi-frozen beverage therein, which apparatus comprises: at least one refrigerated storage cavity for receiving a bulk storage container of liquid beverage; a fluid coupling attached to the bowl; a fluid tube extending between the fluid coupling and said container; and a pump to transport said liquid from said bulk storage container through said coupling into said bowl.

The present invention provides a self-contained liquid storage and delivery apparatus which includes a sensor to sense liquid level of said semi-frozen beverage in said bowl of said machine, said sensor connected to said pump. An optional sensor may also be provided on the pump to sense when the product is depleted.

The present invention also provides a self-contained liquid storage and delivery apparatus which includes a caboose moveable on tracks in said storage cavity.

The present invention also provides a self-contained liquid storage and delivery apparatus including a tray hinged to said caboose to receive said bulk storage container, wherein said tray is movable on a hinge from a storage position to a loading position.

Also provided in the present invention is a self-contained liquid storage and delivery apparatus wherein said tray is moveable approximately 75° with respect to said caboose.

The present invention also provides a self-contained liquid storage and. delivery apparatus wherein said fluid coupling is thermally conductive and includes a one-way check valve.

The present invention provides a self-contained liquid storage and delivery apparatus wherein said bulk storage container is a flexible membrane bag within a rigid box and includes a connection nipple.

The present invention provides a self-contained liquid storage and delivery apparatus wherein said apparatus includes a plurality of extending legs to support said storage cavity.

The present invention also provides a self-contained liquid storage and delivery apparatus wherein said legs surround said machine and said storage cavity is above said semi-frozen beverage machine.

The present invention also provides self-contained liquid storage and delivery apparatus having two said storage cavities for two said bulk storage containers.

The present invention provides a self-contained liquid storage and delivery apparatus including a plurality of illuminated display faces.

The present invention provides a self-contained liquid storage and delivery apparatus including at least one water pump in fluid communication with a water supply to deliver water to said bowl through said fluid coupling.

Additionally, the present invention also provides a self-contained storage and delivery apparatus for a semi-frozen liquid beverage machine having a bowl, which apparatus comprises: a housing; at least one refrigerated storage cavity in said housing; and a plurality of legs supporting said housing, said housing above said beverage machine and said legs surrounding said beverage machine.

The present invention also provides a self-contained storage and delivery apparatus including a fluid coupling attached to said bowl and a fluid tube extending between said fluid coupling and said container.

The present invention also provides a self-contained storage and delivery apparatus including a pump to deliver product to said bowl.

The present invention also provides a self-contained storage and delivery apparatus wherein said refrigerated storage cavity retains a bulk storage container.

The present invention provides a method to store, deliver and automatically fill liquid beverage for a chilled or semi-frozen liquid beverage machine having a bowl to contain chilled or semi-frozen beverage, which method comprises: storing at least one bulk storage container of said liquid beverage in a refrigerated storage cavity; and pumping said liquid beverage from said storage container in said refrigerated storage cavity through a thermally conductive coupling into a bowl of said beverage machine.

The present invention also provides a method which includes sensing liquid level with a liquid level sensor in said bowl in order to activate or deactivate said pumping step.

The present invention provides a method which includes the additional step of removing said bulk storage container of said liquid beverage from said cavity and replacing with another container.

The present invention provides a method which includes the additional step of delivering water from a water supply to said bowl.

The present invention also provides a method wherein the step of pumping the liquid beverage includes delivering said liquid beverage to said bowl below the liquid level.

Whereas, the present invention has been described in relation to the drawings attached hereto, it should be understood that other and further modifications, apart from those shown or suggested herein, may be made within the spirit and scope of this invention.

What is claimed is:

1. A self-contained liquid storage and delivery apparatus for a semi-frozen liquid beverage dispensing machine having a bowl to contain semi-frozen beverage therein, which apparatus comprises:
    at least one refrigerated storage cavity for receiving a separate, prepackaged bulk storage container of liquid beverage;
    a fluid coupling adapted to be attached to said bowl;
    a fluid passageway tube extending between said fluid coupling and said prepackaged bulk storage container;
    a pump to transport said liquid from said bulk storage container through said tube and through said coupling into said bowl; and
    a sensor to sense liquid level of said semi-frozen beverage in said bowl of said machine, said sensor connected to said pump.

2. A self-contained liquid storage and delivery apparatus as set forth in claim 1 including a caboose moveable on tracks in said storage cavity.

3. A self-contained liquid storage and delivery apparatus as set forth in claim 2 including a tray hinged to said caboose to receive said bulk storage container, wherein said tray is movable on a hinge from a storage position to a loading position.

4. A self-contained liquid storage and delivery apparatus as set forth in claim 3 wherein said tray is moveable approximately 75° with respect to said caboose.

5. A self-contained liquid storage and delivery apparatus as set forth in claim 1 wherein said fluid coupling is thermally conductive and includes a one-way check valve.

6. A self-contained liquid storage and delivery apparatus as set forth in claim 5 wherein said fluid coupling connects with a bowl coupling of a thermally conductive material.

7. A self-contained liquid storage and delivery apparatus as set forth in claim 1 wherein said bulk storage container is a flexible membrane bag within a rigid box and includes a connection nipple.

8. A self-contained liquid storage and delivery apparatus as set forth in claim 1 wherein said apparatus includes a plurality of extending legs to support said storage cavity.

9. A self-contained liquid storage and delivery apparatus as set forth in claim 1 having two said storage cavities for two said bulk storage containers.

10. A self-contained liquid storage and delivery apparatus as set forth in claim 1 including at least one illuminated merchandising display face on said apparatus.

11. A self-contained liquid storage and delivery apparatus as set forth in claim 1 including at least one video display.

12. A self-contained liquid storage and delivery apparatus as set forth in claim 1 wherein said fluid tube is within a refrigerated zone.

13. A self-contained liquid storage aid delivery apparatus as set forth in claim 1 wherein said fluid coupling is attached to said bowl below a level of said liquid in said bowl.

14. A self-contained storage and delivery apparatus for a semi-frozen liquid beverage machine having a bowl, which apparatus-comprises:

a housing;

at least one refrigerated storage cavity in said housing for receiving a bulk storage container of liquid beverage; and a plurality of legs supporting said housing, said housing above said beverage machine and said legs surrounding said beverage machine.

15. A self-contained storage and delivery apparatus as set forth in claim 14 including a fluid coupling attached to said bowl and a fluid tube extending between said fluid coupling and said container.

16. A self-contained storage and delivery apparatus as set forth in claim 15 wherein said fluid tube is within a refrigerated zone of said housing.

17. A self-contained storage and delivery apparatus as set forth in claim 14 wherein said bowl is in fluid communication with a water supply and with said bowl to deliver water to said bowl.

18. A self-contained storage and delivery apparatus as set forth in claim 15 wherein said fluid coupling is attached to said bowl below a level of said beverage in said bowl.

19. A method to store, deliver and automatically fill liquid beverage for supplying a separate, discrete semi-frozen liquid beverage machine having a bowl to contain beverage products, which method comprises:

storing at least one prepackaged bulk storage container of said beverage products in a refrigerated storage cavity separate and discrete from said liquid beverage machine;

transporting said beverage products from said storage container in said refrigerated storage cavity through a thermally conductive passageway into a bowl of said beverage machine by pumping with a pump; and sensing liquid level with a liquid level sensor in said bowl in order to activate or deactivate said pumping.

20. A method as set forth in claim 19 including the additional step of removing said prepackaged bulk storage container of said liquid beverage from said cavity and replacing with another storage container.

21. A self-contained liquid storage and delivery apparatus for a semi-frozen liquid beverage dispensing machine having a bowl to contain semi-frozen beverage therein, which apparatus comprises:

at least one refrigerated storage cavity for receiving a separate, prepackaged bulk storage container of liquid beverage;

a fluid coupling adapted to be attached to said bowl;

a fluid passageway extending between said fluid coupling and said prepackaged bulk storage container; and a plurality of extending legs to support said storage cavity, wherein said legs surround said machine and said storage cavity is above said machine.

22. A self-contained liquid storage and delivery apparatus for a semi-frozen liquid beverage dispensing machine having a bowl to contain semi-frozen beverage therein, which apparatus comprises:

at least one refrigerated storage cavity for receiving a separate, prepackaged bulk storage container of liquid beverage;

a fluid coupling adapted to be attached to said bowl;

a fluid passageway extending between said fluid coupling and said prepackaged bulk storage container; and a solenoid valve and a water supply to deliver water to said bowl through a second fluid coupling.

23. A self-contained liquid storage and delivery apparatus as set forth in claim 22 including a water supply to deliver water to said bowl through said second fluid coupling.

24. A method to store, deliver and automatically fill liquid beverage for a semi-frozen liquid beverage machine having a bowl to contain beverage products, which method comprises:

storing at least one prepackaged bulk storage container of said beverage products in a refrigerated storage cavity separate and discrete from said liquid beverage machine;

transporting said beverage products from said storage container in said refrigerated storage cavity through a thermally conductive passageway into a bowl of said beverage machine; and delivering water from a water supply to deliver water to a bowl.

25. A method to store, deliver and automatically fill liquid beverage for a semi-frozen liquid beverage machine having a bowl to contain beverage products, which method comprises:

storing at least one prepackaged bulk storage container of said beverage products in a refrigerated storage cavity separate and discrete from said liquid beverage machine;

transporting said beverage products from said storage container in said refrigerated storage cavity through a thermally conductive passageway into a bowl of said beverage machine; and wherein the step of transporting said liquid beverage includes delivering said liquid beverage to said bowl below the liquid level in said bowl.

* * * * *